United States Patent [19]

Willingham et al.

[11] Patent Number: 5,126,081
[45] Date of Patent: * Jun. 30, 1992

[54] POLYCRYSTALLINE ZINC SULFIDE AND ZINC SELENIDE ARTICLES HAVING IMPROVED OPTICAL QUALITY

[75] Inventors: Charles B. Willingham, Framingham; James Pappis, Westwood, both of Mass.

[73] Assignee: Raytheon Company, Lexington, Mass.

[*] Notice: The portion of the term of this patent subsequent to Dec. 1, 1998 has been disclaimed.

[21] Appl. No.: 515,812

[22] Filed: Apr. 27, 1990

Related U.S. Application Data

[63] Continuation of Ser. No. 619,642, Jun. 14, 1984, Pat. No. 4,944,900, which is a continuation of Ser. No. 473,983, Mar. 16, 1983, abandoned, which is a continuation of Ser. No. 220,944, Dec. 29, 1980, abandoned.

[51] Int. Cl.$^5$ .............................................. C04B 35/64
[52] U.S. Cl. .................................... 264/1.2; 264/62; 264/65; 264/85; 264/570
[58] Field of Search ................... 264/1.2, 62, 65, 85, 264/570

[56] References Cited

U.S. PATENT DOCUMENTS

| | | |
|---|---|---|
| 3,131,025 | 4/1964 | Carnall, Jr. et al. |
| 3,131,026 | 4/1964 | Carnall, Jr. et al. |
| 3,131,238 | 4/1964 | Carnall, Jr. et al. |
| 3,454,358 | 7/1969 | Roy et al. |
| 3,454,685 | 7/1969 | Roy et al. |
| 3,475,116 | 10/1969 | Carnall, Jr. et al. |
| 4,217,318 | 8/1980 | Anderson. |
| 4,303,635 | 12/1981 | Aldinger et al. |

FOREIGN PATENT DOCUMENTS

| | | |
|---|---|---|
| 1244433 | 7/1967 | Fed. Rep. of Germany. |
| 2492362 | 4/1982 | France. |
| 41-412 | 1/1966 | Japan. |
| 55-131102 | 10/1980 | Japan. |
| 132046 | 10/1980 | Japan. |
| 57-11824 | 1/1982 | Japan. |
| 934421 | 8/1963 | United Kingdom. |
| 978518 | 12/1964 | United Kingdom. |
| 1013156 | 12/1965 | United Kingdom. |
| 1139280 | 1/1969 | United Kingdom. |
| 1509238 | 5/1978 | United Kingdom. |
| 1547172 | 6/1979 | United Kingdom. |

OTHER PUBLICATIONS

Huffadine, et al., A Simple Hot Isostatic Pressing Technique, Proceeding of the British Ceramic Society, No. 12, Mar. 1969, pp. 201-209.

diBenedetto, et al., Chemical Vapor Deposition of Multispectral Domes, Apr. 1975, AFML-TR-75-27, Final Report for Period Mar. 1973-Dec. 1974, DD 1473 and pp. 30-32.

Marilyn J. Dodge, Refractive Properties of CVD Zinc Sulfide*, Laser Induced Damage in Optical Materials, 1977, NBS Special Publication #509, A. Glass & A. Guenther (ED), pp. 83-86.

diBenedetto, et al. Improved Large ZnS Windows, Technical Report AFAL-TR-73-176, May 1973 (published Jul. 1976), pp. ii-vii, 1-52, and DD 1473.

(List continued on next page.)

Primary Examiner—James Derrington
Attorney, Agent, or Firm—Denis G. Maloney; Richard M. Sharkansky

[57] ABSTRACT

Articles of polycrystalline zinc sulfide and zinc selenide achieve substantially improved optical quality by a treatment of heat and isostatic pressure by means of an inert working fluid. The treated specimens are transparent and have substantial transmission in the infrared and visible range of the spectrum. Additional improvement in the transmission characteristics is achieved by wrapping the specimens in a foil of an inert material prior to treatment.

10 Claims, 1 Drawing Sheet

Letter from Application Ser. No. 473,983, "Information Relating to Litigation," filed in accordance with MPEP 200.06(c).

OTHER PUBLICATIONS diBenedetto, Chemical Vapor Deposition of Multispectral Domes, National Technical Information Service, Apr. 1975 (published Nov. 1975), DD 1473 and pp. iii, v-viii and 1-79.

Dr. Peter Price, Hot Isostatic Pressing-a New Heat Treating Technology with Tremendous Potential, Industrial Heating, Jun. 1979, pp. 8-10.

Proceedings of the Symposium on the Material Science Aspects of Thin Film Systems for Solar Energy Conversion, May 20-22, 1974, organized by Optical Sciences Center, Ariz., pp. 402-918.

Thomas Deutsch, Laser Window Materials-an Overview, Journal of Electronics, vol. 4, No. 4, 1975, pp. 663-705, 708-719.

Widmer, Densification of Castings by Hot Isostatic Pressing 26th Annual Meeting of the Investment Casting Inst. Oct. 1978 Phoenix Ariz.

H. E. Bennett, Laser Induced Damage in Optical Materials, #AD-A088 U.S. Department of Commerce, Jul. 1980.

L. D. Landau and E. M. Lifschitz, Statistische Physik, Akademie-Verlad, Berlin, 1975, pp. 75-77 and 297-298.

Vaughan, et al., Mineral Chemistry of Metal Sulfides, Cambridge University Press, 1978, pp. 271-272.

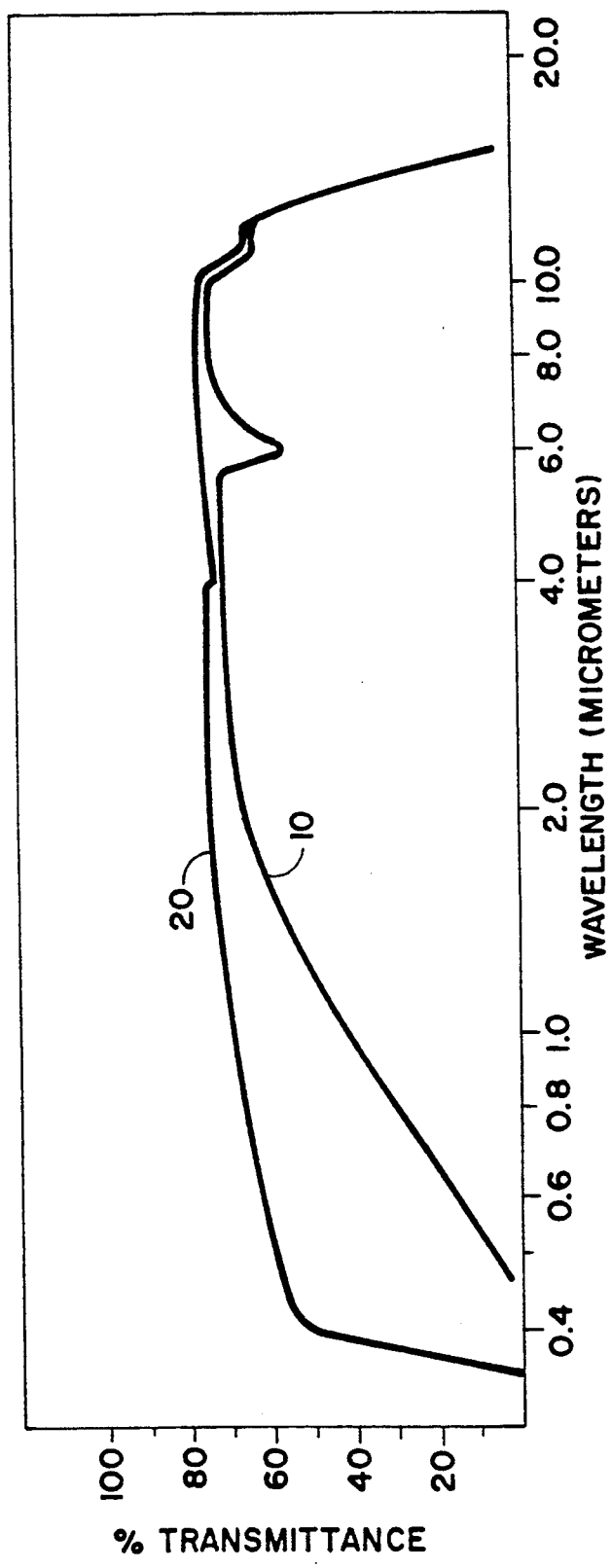

POLYCRYSTALLINE ZINC SULFIDE AND ZINC SELENIDE ARTICLES HAVING IMPROVED OPTICAL QUALITY

This is a continuation of U.S. Application Ser. No. 06/619,642, Jun. 14, 1984, now abandoned, which is a continuation of Ser. No. 06/473,983, Mar. 16, 1983, now abandoned, which is a continuation of Ser. No. 06/220,944, Dec. 29, 1980, now abandoned.

BACKGROUND OF THE INVENTION

Zinc sulfide and zinc selenide are used in applications requiring long wavelength infrared transmission capability such as missile domes. Zinc sulfide is a principal window material for air borne FLIR systems. These compounds are some of the most chemically and mechanically durable materials which are transparent in the infrared range of the electromagnetic spectrum to approximately 10 micrometers, are available in useful sizes, and have potential for transmission in the visible range of the spectrum. A problem with these compounds is that they do not have adequate transmission in the visible and near-infrared range of the electromagnetic spectrum. Additional applications for these compounds could be developed if their transparency at visible and near-infrared wavelengths could be improved. More specifically, they could then be used in applications requiring multi-spectral capability. While their far-infrared wavelength limitation is an intrinsic property of the material and is related to multi-phonon absorption, their short wavelength limitation is determined by several incompletely characterized extrinsic effects.

SUMMARY OF THE INVENTION

Hot isostatic pressing (HIP) is the simultaneous application of heat and pressure by means of an inert working fluid. It was discovered that HIP treatment of zinc sulfide and zinc selenide specimens produces improvement beyond the elimination of pores. It substantially improved the transparency at wavelengths shorter than two microns. Specimens of zinc sulfide also were found to have improved transmission characteristics throughout their effective spectral band. The limitation in the transparency of zinc sulfide and zinc selenide is due to scattering and absorption mechanisms. At wavelengths below two micrometers, it is believed that scatter, not absorption, is the principal mechanism that limits transmission. It is found that HIP treatment reduces scatter, not only by reducing or eliminating porosity, but also by reducing or eliminating second phase inclusions, by allowing out-diffusion of impurities, and, in the case of zinc sulfide, by promoting inversion of zinc sulfide non-cubic polymorphs to their cubic form. Overall, absorption is reduced by HIP treatment by allowing diffusion of absorbing species that might be present. HIP treatment is also found to produce the stoichiometric ratio of the component atoms for both ZnS and ZnSe.

This invention further provides for a method of treating an article of ZnS or ZnSe by controlling the chemical potential on the surface of the article, heating the article, and applying isostatic pressure. Preferably said chemical potential control is achieved by wrapping the article in a foil of an inert material while still allowing some vapor exchange.

BRIEF DESCRIPTION OF THE DRAWINGS

Other and further objects and advantages of the invention will become apparent as the description thereof progresses, reference being had to the accompanying drawing which shows the transmission spectra for a specimen of ZnS before and after treatment.

DESCRIPTION OF THE PREFERRED EMBODIMENT

Hot Isostatic Pressing (HIP), the simultaneous application of heat and pressure by means of an inert working fluid, is used in metallurgical fabrication of powder metal compacts and castings to improve fracture strength and fatigue resistance. This invention uses similar HIP equipment to treat specimens of zinc sulfide and zinc selenide. The specimens to be treated are placed in a HIP furnace of conventional design. The furnace is evacuated, and then pressurized with an inert gas, such as argon. Heat is applied and the temperature and pressure are allowed to stabilize. The pressure and heat are maintained for a period of time sufficient to substantially eliminate a variety of impurities and defects from the specimens. The specimens treated have included chemical vapor deposition (CVD) zinc sulfide as well as hotpressed zinc sulfide. Specimens of CVD zinc selenide were also treated. Currently available specimens of zinc sulfide and zinc selenide are colored and translucent. For zinc sulfide, the coloration results from deviations from a strict stoichiometric ratio of the atoms in the material. The specimens are translucent rather than transparent because light is scattered by defects in the bulk of the material. The exact nature of all the different types of defects is not known. The color, types and relative amounts of light scattering defects are determined by the technique used to prepare the material and by the processing conditions of the preparation. The scattering defects severely limit the transparency at wavelengths shorter than approximately two micrometers. Additionally, there are, some absorption bands at different wavelengths which depend on the method of fabrication of the specimen. The long wavelength limit of the transmission band is an intrinsic property of the material and is due to a multi-phonon absorption phenomenon. For wavelengths between approximately 2 $\mu$m and the long wavelength limit, the transmission is limited principally by impurity-related absorption phenomena. The limitation in transparency in these materials at visible and near infrared wavelengths is due to a combination of incompletely characterized absorption and scattering phenomena, but scattering predominates. The short wavelength limit of the transmission band is ultimatley an intrinsic material characteristic, but non-stoichiometry, impurities and other point defects can diminish transparency at wavelengths close to the short wavelength limit. Hot isostatic processing (HIP) treatment reduces these limitations not only by reducing or eliminating the porosity of the material, but also by reducing or eliminating many of the defects that contribute to scatter and absorption. This is due to a combination of factors produced by HIP treatment through simultaneous application of heat and pressure. The applied heat allows substantial out-diffusion of impurities normally present in the material. These impurities may consist of actual impurities formed by contaminating atoms of elements other than those forming the ideal compound, or may consist of defects in the crystal lattice, such as vacancies and interstitial atoms. In any event, these impurities will diffuse out to the surface of the specimen at a rate which is a function of temperature. Impurity atoms may be present within the sulfide or selenide crystals as separate distinct phases. The heat supplied also helps to reduce or eliminate these inclusions of second phase precipitates of the compound being treated. The applied pressure helps to eliminate such residual porosity as may be present in the specimen prior to the treatment, and restrains the formation of new porosity which could otherwise develop during the process. Additionally, the pressure is used to limit the volatilization of the compounds, since the compounds used have appreciable vapor pressure at useful treatment temperatures. In the case of zinc sulfide compounds, the optically isotropic cubic crystalline form has a higher density than the birefringent hexagonal form. The pressure of the HIP treatment is found to favor inversion of non-cubic polymorphs into cubic crystals. Furthermore, the pressure decreases the equilibrium concentration of interstitial atoms and vacancies of the crystal lattice, and generally decreases the solubility of impurities.

Specimens of zinc sulfide have included both the chemical vapor deposition (CVD) and hot-pressed types. Zinc selenide specimens have been of the CVD type. It is found that hot-pressed zinc selenide specimens have substantially inferior transmission characteristics as compared to CVD zinc selenide specimens and thus are not generally available. However, this treatment should improve the characteristics of hot-pressed zinc selenide as well. The duration of the treatment depends on the initial quality of the specimen. The better the quality, i.e. transmission capability, of the specimen, the shorter the treatment time can be to achieve a predetermined level of transmission improvement. It has been found that hot pressed zinc sulfide material has larger concentrations of impurities or defects that affect scattering as compared to zinc sulfide prepared by the CVD process. The duration of the treatment is also determined by thickness of the starting sample. The greater the thickness the longer the treatment has to last to achieve a predetermined level of transmission improvement.

As discussed above, it has been discovered that subjecting specimens to HIP treatment improves the optical characteristic of optical elements. This is due to a combination of factors. The heat provided seems to favor an out-diffusion of impurities from the core of the specimen to the outside surface. The pressure limits the volatilization of the compound and also helps to eliminate and prevent the formation of porosity. In the case of zinc sulfide, the pressure is also believed to force any non-cubic polymorphs present into their cubic form. This provides a guideline in the selection of operating temperature and pressure. The temperature should be high enough to allow the out-diffusion of impurities from the body of the specimen. The pressure should be high enough to both prevent volatilization, and to substantially eliminate porosity in the specimen. The duration of the treatment is determined by both the thickness of the specimen as well as its initial optical quality. The less transmitting samples normally require a longer treatment time to achieve a predetermined level of optical transparency. However, an upper limit to the duration of the treatment might be determined by an excessive amount of grain growth that might take place during an unreasonably long treatment. It is also found that the CVD type zinc sulfide achieves a substantially better amount of optical improvement than the hot-pressed zinc sulfide specimens. This is probably due to the fact that the hot-pressing process tends to produce larger size defects which do not out-diffuse as well with this process.

A six millimeter specimen of CVD zinc sulfide was processed in three hours by the application of 990° C. and 5,000 psi and resulted in visible improvement of the optical characteristics of the specimen. A pressure of 30,000 psi and a temperature of 1000° C. was used for a hot-pressed specimen of zinc sulfide and a CVD zinc selenide specimen, again resulting in substantial optical improvement. A 15 millimeter specimen of CVD zinc sulfide, using a temperature of approximately 1000° C. and pressure of 30,000 psi as above, was successfully treated in approximately twenty-four hours. Temperature range of 700° C. to 1050° C. and a pressure range of 5,000 to 30,000 psi have been used to date on different types of specimens. The times range from three hours for the smaller thickness mentioned to thirty-six hours for larger sample thicknesses. It is intended, however, that the invention be not thereby limited to the disclosed operating parameters. Substantially different combinations of temperature, pressure and duration of the treatment will produce improvements of the optical quality of the treated specimens to some degree. The actual operating parameters are normally dictated by the requirements of specific applications. Substantially lower temperatures and pressures might be used to produce a predetermined amount of improvement.

Some specimens were first wrapped in a foil of second material prior to the application of heat and pressure in the HIP apparatus. The wrappings are not vacuum tight but they serve to limit the vapor exchange between the specimens and the reaction chamber and also serve to control the chemical potential of the volatile species in the specimens in order to enhance the treatment. This control of the chemical potential of the volatile species on the surface of the specimens could be achieved by other means, such as use of dopants in the working gas or solids that will give off vapor species. Different types of material have been used. Graphite, mild steel, tantalum, copper and platinum foils have been used. The platinum wrapping foil results in the best improvement of transmission characteristics for the samples. This is probably due to its inert nature.

Referring now to the drawing, there is shown the transmission spectrum of a six millimeter thick CVD zinc sulfide specimen. Line 10 is for the original specimen prior to treatment and line 20 is for the same specimen after a HIP treatment for three hours at 1000° C. and 30,000 psi. The HIP treatment has substantially improved short wavelength transmittance of the material and has also eliminated the infrared absorption band at six micrometers. Absorptions bands in zinc sulfide depend on the manufacturing method and operating conditions but these are expected to be substantially improved by the HIP treatment. Visually, the untreated specimen is yellow-orange and hazy to the extent that it cannot be used for imaging at visible wavelengths. The treated material is colorless because treatment has adjusted the stoichiometry to the correct one-to-one zinc to sulphur ratio and is water clear because the treatment has very substantially reduced the concentration of light scattering defects. HIP treatment substantially improves the transmissivity at wavelengths greater than 2 micrometers. Other specimens of ZnS were similarly treated at 30,000 psi at 990° C. for twenty-four hours. Specimens ranged in thickness from 0.4 to 1.5 centimeters.

The following table summarizes absorption coefficient measurements for a 6 millimeter thick ZnS specimen similar to the one of the drawing. These apparent absorptance values were calculated by dividing the fraction of absorbed light by the thickness of the specimen and thus includes surface contribution to the absorption.

| Apparent Absorption Coefficient of CVD ZnS (CM$^{-1}$) | | |
|---|---|---|
| Wavelength (Micrometer) | Untreated | After Treatment |
| 2.8 | $4.09 \times 10^{-3}$ | $8.6 \times 10^{-4}$ |
| 3.8 | $2.19 \times 10^{-2}$ | $2.16 \times 10^{-3}$ |
| 9.27 | $7.41 \times 10^{-2}$ | $1.29 \times 10^{-2}$ |
| 10.6 | $2.54 \times 10^{-1}$ | $1.92 \times 10^{-1}$ |

A six millimeter thick spectrum of CVD zinc selenide was also treated for three hours at 1000° C. and 30,000 psi. Visually, the untreated specimen is yellow in color and hazy. After treatment, the color is yellow-green and transparent. This color is due to the correct stoichiometry for zinc selenide. The transparency in the visible range is substantially improved. Using a spectrometer, the transmission of the specimen at 0.5 micrometer was measured before treatment and was found to be 5%, while after treatment transmission was found to be 50%. This substantial improvement is due mainly to the adjustment to the stoichiometric ratio that the treatment provides. A measure was also obtained of the scattering of light of the specimen before and after treatment. A He-Ne laser was used to provide a source of light at 0.6328 micrometers. The fraction of light scattered at 90° to the incident laser beam was measured in (Steradian)$^{-1}$ as follows:

| Prior to treatment | $2 \times 10^{-3}$ |
|---|---|
| After treatment | $4.5 \times 10^{-4}$ |

This indicates that the types of impurities in this material give rise substantially to scatter, the phenomenon that is responsible for reduced transmission at low wavelength and the one that HIP treatment is believed to reduce effectively.

This completes the description of the invention. Many modifications thereof will be apparent to persons skilled in the art without departing from the spirit and scope of this invention. Accordingly, it is intended that this invention be not limited therein except by defined by the appended claims.

What is claimed is:

1. A method of treating a transmissive body of zinc sulfide or zinc selenide having electromagnetic energy absorbing impurities therein to increase the optical transmissivity of such body comprising the step of reducing such absorbing impurities comprising heating said body to a temperature in the range of 700° C. to 1050° C. and applying, simultaneously with such heating, isostatic pressure to said body of at least 5000 psi, such heating and pressure being applied for a time duration of at least three hours.

2. The method of claim 1 further comprising:
   controlling the chemical potential on the surface of said body.

3. The method of claim 2 further comprises:
   wrapping said body in a foil prior to the application of heat and pressure.

4. The method of claim 3 wherein:
   said foil is not vacuum tight.

5. A method of treating an optically transmissive body of zinc sulfide or zinc selenide comprising the step of hot isostatically pressing such body at a temperature and pressure and for a time duration determined in accordance with the thickness of the body to cause out-diffusion of impurities from the body.

6. The method recited in claim 5 comprising the step of controlling the chemical potential of the surface of the body during the hot isostatic pressing.

7. A method of treating an optically transmissive body of zinc sulfide comprising the step of hot isostatically pressing such body sufficiently to reduce by at least 50% the apparent absorption coefficient of the body at a wavelength within a range from 2.8 to 9.27 micrometers.

8. A method of treating an optically transmissive body of zinc sulfide or zinc selenide comprising the step of hot isostatically pressing such body sufficiently to increase by at least 50% the transmittance of a six millimeter thick sample of the body at a wavelength within a range from 0.4 to 0.7 micrometers.

9. A method of treating an optically transmissive body of a zinc sulfide formed by chemical vapor deposition and having an absorption band at about six micrometers comprising the step of hot isostatically pressing such body sufficiently to substantially remove said absorption band at about six micrometers.

10. The method recited in claims 1, 2, 3, 4, 5, 6, 7, or 8 wherein the body is a chemically vapor deposited body.

* * * * *